No. 850,597. PATENTED APR. 16, 1907.
J. F. McCANNA.
GEARING.
APPLICATION FILED DEC. 21, 1905.

Witnesses:

Inventor:
John F. McCanna
By Coburn & McRoberts
his Att'ys

THE NORRIS PETERS CO., WASHINGTON, D. C.

UNITED STATES PATENT OFFICE.

JOHN F. McCANNA, OF CHICAGO, ILLINOIS, ASSIGNOR TO McCORD & COMPANY, OF CHICAGO, ILLINOIS, A CORPORATION OF NEW JERSEY.

GEARING.

No. 850,597.     Specification of Letters Patent.     Patented April 16, 1907.

Application filed December 21, 1905. Serial No. 292,678.

*To all whom it may concern:*

Be it known that I, JOHN F. McCANNA, a citizen of the United States, residing at Chicago, in the county of Cook and State of Illinois, have invented certain new and useful Improvements in Gearing, of which the following is a specification, reference being had therein to the accompanying drawings.

This invention relates to improvements in gearing, and has particular reference to a novel form of gearing for converting high-speed rotary motion into low-speed rotary or reciprocatory motion.

The invention consists of the combinations and arrangements of parts hereinafter particularly described and then pointed out in the appended claims.

Figure 1:
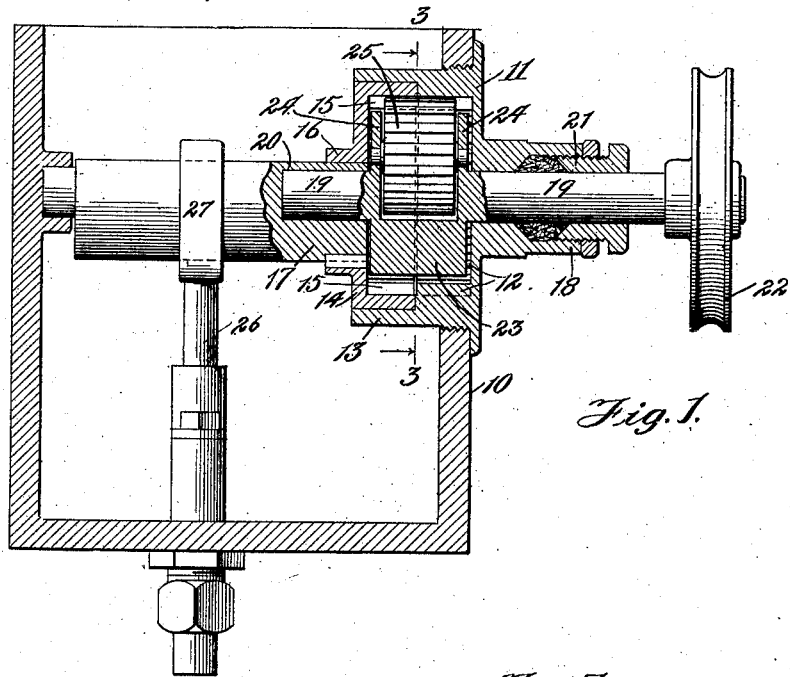
Figure 2:
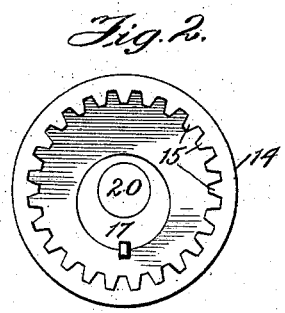
Figure 3:
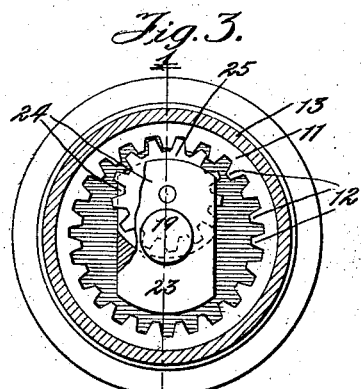
Figure 4:
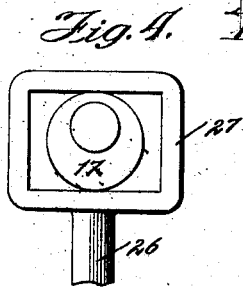

In the accompanying drawings, which illustrate one embodiment of the invention, Figure 1 is a sectional view of the gearing on the line 1 1 of Fig. 3, showing the gearing as it may be employed for operating a reciprocating member, such as a pump-piston. Fig. 2 is a face view of the rotatable or driven gear. Fig. 3 is a sectional view on the line 3 3 of Fig. 1, particularly illustrating the fixed gear and the planetary pinion meshing therewith and reducing the speed of the driving-shaft; and Fig. 4 illustrates a detail.

Referring to Fig. 1, 10 indicates a suitable frame or support which consists, in the present instance, of a reservoir designed when the gearing is employed to operate a lubricating pump or pumps to contain the lubricating-oil.

The numeral 11 indicates a fixed gear which in the present embodiment of the invention takes the form of a hollow or cup-shaped plug, screwing into a suitable opening in the wall of the reservoir and provided with internal gear-teeth 12. The gear 11 is provided beyond the teeth thereof with an annular extension or collar 13, which has a greater internal diameter than the internal gear and receives and forms a bearing for a rotatable gear 14, having internal teeth 15, the crowns of the teeth being on the same radius as that of the teeth of the gear 11. The gear 14 is cup-shaped and with the fixed gear 11 provides a circular chamber. The gear 14 is provided with a hub 16, the opening of which is eccentric to such gear and receives one end of an eccentric-shaft 17, the other end of which may be supported in a suitable bearing in the reservoir, as shown.

As shown in Fig. 1, the fixed gear 11 is provided with an outwardly-extending bearing-sleeve 18, in which is journaled a shaft 19, the inner end of which is journaled in a recess 20 in the adjacent end of the eccentric 16. The shaft 19 is coaxial with the internal gears 11 and 14, while the eccentric 16 is eccentric to such shaft. The bearing-sleeve 18 is provided with a suitable packing-gland 21 to prevent the escape of lubricant from the reservoir 10. The outer end of the shaft 19 is provided with a suitable pulley 22, to which motion may be communicated by a belt or other means driven from any suitable source of power.

The shaft 19, within the chamber provided by the gears 11 and 14, is cut out and connected by a block 23, such block being offset from the line of the shaft 19 at one side and being bifurcated beyond the other side to provide a pair of arms 24. A pinion 25 is pivoted between the arms 24, its pivot being eccentric to the shaft 19. This pinion extends beyond the ends of the arms 24 and engages the teeth of the internal gears 11 and 14, while the inner portion of the pinion extends into the cut-out portion of the shaft. The gear 11 with its internal teeth provides a toothed track for the pinion, which, by reason of the rotation of the shaft 19 and its engagement with the fixed gear, has a planetary movement.

In the present arrangement the gears 11 and 14, while of the same internal diameter, are provided with a different number of teeth, the gear 11 having twenty-three teeth, while the gear 14 has twenty-four teeth, such teeth being slightly smaller than the teeth of the gear 11. With this ratio the speed of the shaft 19 with reference to that of the eccentric 16 is as twenty-four to one—that is to say, with each twenty-four rotations of the shaft 19 the eccentric is rotated once. This ratio may obviously be varied by varying the relative number of teeth of the internal gears 11 and 14. For example, if the gear 11 were provided with twenty-four teeth and the gear 14 with twenty-three the speed of the shaft 19 with reference to the eccentric 16 would be as twenty-three to one. As the relative speed of the shaft and gear 14 depends upon the ratio of the gear 11 to the gear 14, the speed of the gear 14 may obviously be varied by varying the ratios of the gears. By varying the ratio any desired speed of the driven number with reference to the driving member may be obtained.

In the present embodiment of the invention the low-speed movement of the eccentric is converted into a reciprocating movement of the piston 26 of a suitable pump located in the reservoir and designed to discharge therefrom the lubricant to the bearing with which the pump is associated. The pump-piston is provided with a yoke 27, through which the eccentric passes, so as to impart a reciprocatory motion to the piston.

In operation the shaft 19 is driven at relatively high speed from a suitable source of power, and the pinion, having its pivot eccentric to the shaft, is revolved about the axis of the shaft; but owing to the engagement of the pinion with the teeth of the fixed gear such pinion is rotated on its axis in a direction the reverse of the shaft 19 and imparts a slow movement to the gear 14 in the same direction as the shaft 19, the gear 14 being moved one tooth at each complete rotation of the shaft 19. As the gear 14 is rotated the eccentric moves at the same speed, thereby imparting a slow reciprocating movement to the element 26, in the present instance the pump-piston.

While I have described the invention in connection with a lubricating-pump, this is merely by way of illustration, and it is not to be understood that the invention is limited thereto. It will be obvious that the gearing may be employed in any situation where it is desired to utilize a compact and simple arrangement for converting a high rotary speed to a low rotary or reciprocating movement.

Having described my invention, what I claim as new, and desire to secure by Letters Patent of the United States, is—

1. In a device of the class described, a fixed internal gear having a collar and a rotatable internal gear having a bearing in the said collar, a two-part shaft coaxial with such gears, an offset block connecting the parts of the shaft and provided with a pair of arms, and a pinion pivoted in the arms eccentrically to the shaft and having a planetary movement in engagement with the fixed gear to drive the rotatable gear at a slower speed than but in the same direction as the shaft.

2. A device for converting high-speed rotary motion into low-speed reciprocating motion, comprising a fixed internal gear and a rotatable internal gear, said gears having different numbers of teeth, an eccentric fixed to the rotatable gear for moving a reciprocating element, a two-part driving-shaft coaxial with and journaled in the gears, an offset block connecting the parts of the shaft and bifurcated opposite the offset, and a pinion pivoted on the bifurcations of the block and having its pivot eccentric to the shaft whereby the pinion has a planetary movement about the shaft in engagement with the fixed gear to impart a relatively slow movement to the rotatable gear.

In testimony whereof I affix my signature in presence of two witnesses.

JOHN F. McCANNA.

Witnesses:
 ARTHUR B. SEIBOLD,
 ELIZABETH MOLITOR.